Patented May 16, 1950

2,508,112

UNITED STATES PATENT OFFICE 2,508,112

ANIMAL FOOD MANUFACTURE

Raymond R. Haugh, Evanston, Ill., assignor to Kraft Foods Company, Chicago, Ill., a corporation of Delaware No Drawing. Application July 12, 1946, Serial No. 683,149

4 Claims. (Cl. 99—2)

The invention relates to animal food manufacture and is of particular value in connection with the manufacture of a so-called supplement or balancing ration for feeding poultry and farm stock.

In general heretofore, it has been the practice for the farmer or poultry raiser to purchase a made-up supplement which is mixed and ground by the feed merchant or feed manufacturer. Such a supplement or mixed feed is usually in the form of a dry powder of varying particle size. In that form, it is impossible for the farmer to determine exactly whether the feed has been made up in accordance with the supposed formula, and furthermore the feed in powder form is wasted to some extent by stock due to spillage or scattering.

I have discovered a practical, efficient and economical method of making up a feed supplement or feed ingredient in the form of relatively large grains or pellets which contain the correct percentages of the components of the supplement and which pellets are, as to their physical or mechanical characteristics, sufficiently rugged that they may be stored under ordinary conditions and shipped relatively large distances without breakage, powdering or other deterioration. The invention lends itself to a manufacturing and distributing system which permits economical manufacture of the pellets at a central plant and subsequent distribution of the pellets in any desired quantities to any point of sale, or, if desired, direct to the farm from the manufacturing plant. This is very desirable for a number of reasons. For example, the manufacturer may make up a supplement of standard composition, and there is no possibility of a change in composition before it reaches the farm. Thus the farmer and the manufacturer both benefit.

General method

Supplements for various feeding purposes may vary in composition. For example, poultry, swine, beef cattle and dairy cattle, under the same conditions, require a supp'ement of a different composition, in order to obtain the best results, in addition to which the season of the year and difference in local conditions may determine to some extent the optimum composition from the standpoint of dollar return. However, it has been found that a supplement in which lactose or whey solids represent on a dry basis from 20% to 50% of the mix gives good results, though 40% is somewhat more desirable, it being understood that the supplement contains the desired amount of protein material. The protein component may be in various forms, for example dry soy bean meal from which the fat has been removed. Some of the desirable vitamins not otherwise present can be added in the form of dry brewer's yeast and alfalfa meal.

It has been the practice to combine all such materials in dry form, grinding them if necessary. According to my improved method, the ingredients of the batch, which preferably contains, on the dry basis, about 15 to 70% of lactose, are mixed together, sufficient water being included to produce a plastic mass in the form of a rather stiff paste. The water content of the mixture will be about 10 to 30%, the optimum water content varying somewhat in accordance with the character of the other feed components.

The paste such as I have described, containing from 15% to 70% of lactose and sufficient water to impart a plastic consistency to the mass, will not retain its physical or mechanical characteristics over any substantial period of time. This is apparently due to the fact that part of the lactose in the batch, in the presence of water, exists in the form of a saturated aqueous solution of lactose. When the mass loses moisture either by evaporation or due to absorption by any hydrophilic property of other components of the batch, the lactose in solution is deprived of the necessary water to maintain the lactose in solution, as a result of which part of the lactose crystallizes, and in so doing forms hydrated alpha lactose, assuming that the temperature is maintained at less than about 95° C. The aqueous fluid which serves to maintain the mobility or plasticity of the mixture in paste form is reduced in two ways: (1) by the hydrophilic action of the other ingredients, and (2) by the formation of hydrated alpha lactose. In a batch of the character of the general type disclosed, the loss of available moisture is so rapid that, in some cases, in fifteen minutes the material becomes too stiff to work.

I not only overcome this difficulty, but make use of it in manufacturing my improved animal feed pellets. To do this, I sub-divide the paste into pellets of the desired size while the material is still in a condition to be worked. By the use of heavy pressure as an incident to the formation of the pellets, I produce them in a sufficiently hard and stable state so that they can be handled thereafter in such a way that they will not stick together or lose their shape. Furthermore, preferably by subjecting the pellets to a drying operation, desirably accompanied by agitation, a sufficient amount of moisture is removed from the product so that it becomes not only mechanically stable, but also chemically and biologically stable.

*Specific example*

To produce a product of particular value as a feed supplement for swine, the following formula has been successfully employed.

| | Pounds |
|---|---|
| Cheese rinds ground up to pass a 5 mesh sieve | 46 |
| Sweet cheese whey concentrated in a vacuum pan to a solids content of about 70% | 82 |
| Dry fat-free soybean meal containing from 40% to 45% protein, ground to pass a 15 mesh sieve | 35 |
| Dehydrated sweet whey concentrate containing about 2% H₂O and ground to a size of less than 20 mesh | 47 |
| Dry brewer's yeast in powder form ground to 100 mesh or finer | 2 |
| Alfalfa meal dehydrated down to about 2% water and ground to pass a 50 mesh sieve | 8 |
| Dehydrated sweet whey solids from which 30% of the original lactose has been removed | 47 |
| Total weight of batch | 267 |

With the above-mentioned formula, it is not usually necessary to add any more water, since the free water content of the batch will be found to be about 20%, and when properly mixed, the batch will have the correct pasty consistency. However, if ingredients containing less moisture than those mentioned are used, it may be necessary to add a little more water in order to arrive at the proper physical consistency.

The batch of components above listed is put into a double arm Read dough mixer and mixed for about 7 minutes without additional heat, the machine operating at from 15 to 20 R. P. M. After the proper mixture and consistency has been obtained, the batch is immediately transferred into a 15 inch double cylinder macaroni press of the horizontal type having a ram of 15 inches diameter and subject to an oil pressure of about 2200 lbs. per square inch. The charge in the cylinder is extruded through a brass die containing several hundred orifices about 1/8 inch in diameter distributed in the working face of the discharge head. The cutting knives which revolve over the outer face of the discharge head are preferably two in number and revolve at such speed in relation to the movement of the ram that the rods of compressed paste which are cut off by the knives are about 1/4 inch in length. Under these conditions, the capacity of the press is about 1000 lbs. per hour when operating at optimum efficiency.

The pellets, in the form of rods about 1/8 inch in diameter and 1/4 inch long, are promptly transferred by means of a continuously operating conveyor to the hot end of a rotary kiln or drum dryer about 4 feet in diameter and 18 feet in length in which the temperature of the entering air is about 250° F. In the examples stated, I have found it apparently more desirable to introduce the hot air and the fresh pellets into the same end of the drum dryer in order to prevent the finished dried pellets from being subjected to too high a temperature.

In some cases, it may be advisable to re-circulate about 1/2 of the discharged pellets through the kiln a second time, in order to drive off the desired amount of moisture. However, the recirculation is a matter of choice and is not essential under proper conditions.

The product finally discharged from the lower or delivery end of the drum dryer contains about 6% moisture. (Moisture was determined by testing in a vacuum oven at 65° C. for 5 hours with an absolute pressure of 3 inches of mercury.)

The final product from the kiln is sifted through suitable screens to take out any over-size lumps caused by the pellets sticking together (usually less than 1% of the total), and in order to screen out the powder which does not usually amount to more than 5% of the product. The under-size powder and the over-size lumps may be re-mixed in a subsequent batch. The screened product is then packed in bags and, after cooling, the bags are closed and are ready for immediate shipment.

In general, it may be said that for poultry a high percentage of whey solids or lactose is preferred, whereas dairy cattle need a high protein content.

I claim:

1. The process of making an animal feed material which comprises making a mixture of the desired food ingredients containing, on the dry basis, 15 to 70 per cent lactose and the remainder including protein feed materials, adjusting the moisture content of the mixture to a point where the mixture contains from about 10 to 30 per cent water thereby producing a plastic mass, extruding the mixture under heavy pressure, and sub-dividing the extruded material into pellets.

2. The process of making an animal feed material which comprises mixing a batch of the desired food ingredients containing, on the dry basis, about 20 to 50 per cent lactose, the remainder including protein feed materials, part of the lactose being in aqueous solution, adjusting the moisture content of the mixture to a point where the mixture contains from about 10 to 30 per cent water thereby producing a plastic paste, extruding the material under heavy pressure, sub-dividing the extruded material to form pellets, and then subjecting the pellets to agitation and drying to reduce the moisture content to about 6 per cent.

3. The process of making an animal feed material which comprises mixing up a batch of the desired food ingredients, said batch including, on the dry basis, about 40 per cent lactose, the remainder including protein feed materials, part of the lactose being in aqueous solution, adjusting the moisture content of the mixture to a point where the mixture contains about 20 per cent water so as to produce a plastic, pasty mass, promptly extruding the mass under heavy pressure from orifices, sub-dividing the extruded material to form the material into pellets, and then agitating and drying the pellets.

4. The process of making animal feed material which comprises making a mixture of the desired food ingredients containing, on the dry basis, between about 20 to 50 per cent lactose, the remainder including protein feed material, adjusting the moisture content of the mixture to a point where the mixture contains from about 10 to 20 per cent water thereby producing a plastic, pasty mass, extruding the mixture under heavy pressure, sub-dividing the extruded material to form pellets, said steps of mixing, extruding, and sub-dividing, being carried out at room temperature, and finally drying the pellets.

RAYMOND R. HAUGH.

REFERENCES CITED

The following references are of record in the file of this patent:

UNITED STATES PATENTS

| Number | Name | Date |
|---|---|---|
| 1,915,911 | Allen | June 27, 1933 |
| 1,944,265 | Pilorz | Jan. 23, 1934 |
| 2,065,863 | Madaus | Dec. 29, 1936 |
| 2,084,956 | Hessel | June 22, 1937 |
| 2,385,068 | Esbaugh | Sept. 18, 1945 |